(12) United States Patent
Kim

(10) Patent No.: US 9,500,893 B2
(45) Date of Patent: Nov. 22, 2016

(54) DISPLAY DEVICE

(71) Applicant: Samsung Display Co., Ltd., Yongin-si, Gyeonggi-do (KR)

(72) Inventor: Kyoung Duck Kim, Cheonan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/613,584

(22) Filed: Feb. 4, 2015

(65) Prior Publication Data

US 2016/0026027 A1 Jan. 28, 2016

(30) Foreign Application Priority Data

Jul. 25, 2014 (KR) .................. 10-2014-0094731

(51) Int. Cl.
*G02F 1/1333* (2006.01)
*G02F 1/1335* (2006.01)

(52) U.S. Cl.
CPC ... *G02F 1/133308* (2013.01); *G02F 1/133504* (2013.01); *G02F 1/133602* (2013.01)

(58) Field of Classification Search
CPC .................. G02F 1/133308; G02F 1/133615; G02F 1/133608; G02F 1/1336; G02F 1/133603; G02F 1/133605; G02F 1/133606; G02F 1/1335; G02F 1/133504; G02F 1/133528; G02F 1/133553; G02F 1/133602; G02F 1/133604; G02F 1/1333; G02F 2001/133317; G02F 2001/133314; G02F 2001/13332; G02F 2001/133322; G02F 2001/133328; G02F 2001/133331; G02F 2201/46; G02F 2201/465; G02F 2201/50; G02F 2201/503; G02B 6/0088; G02B 6/005; G02B 6/0073; G02B 6/0055; G02B 6/0068; G02B 6/009; G02B 6/0031; G02B 6/0051; G02B 6/0091; G02B 6/00; G02B 66/0025; G02B 5/02
USPC ...... 349/58, 65, 61, 62, 64, 67, 96; 362/606, 362/97.1, 611, 84, 97.2, 609, 612, 341, 433, 362/615, 310; 348/790, 794, 836; 361/752, 361/807
See application file for complete search history.

(56) References Cited

U.S. PATENT DOCUMENTS

| | | | | |
|---|---|---|---|---|
| 2006/0044779 | A1* | 3/2006 | Lee | G02F 1/133608 362/23.18 |
| 2008/0143918 | A1* | 6/2008 | Kim | G02F 1/133608 349/58 |
| 2010/0079976 | A1* | 4/2010 | Kamada | G02F 1/133608 362/97.1 |

(Continued)

FOREIGN PATENT DOCUMENTS

| | | |
|---|---|---|
| KR | 1020060109263 | 11/2006 |
| KR | 10-2009-0126891 | 12/2009 |
| KR | 10-2012-0078923 A | 7/2012 |

*Primary Examiner* — Thoi Duong
(74) *Attorney, Agent, or Firm* — Robert E. Bushnell, Esq.

(57) ABSTRACT

A display device may include a display panel, a light source configured to provide the display panel with light, a bottom chassis on which the light source is disposed, a mold frame coupled to the bottom chassis, and a diffuser plate fixed to the mold frame and configured to emit light from the light source to the display panel. The mold frame may include an upper mold on which the display panel is disposed, a lower mold on which the diffuser plate is disposed, and a first connecting part configured to couple the upper and lower molds. The mold frame may have a gap between the upper and lower molds.

19 Claims, 10 Drawing Sheets

(56) References Cited

U.S. PATENT DOCUMENTS

2012/0169967 A1 7/2012 Han et al.
2014/0028946 A1 1/2014 Kuo et al.

* cited by examiner

DISPLAY DEVICE

CLAIM OF PRIORITY

This application claims priority to and all the benefits accruing under 35 U.S.C. §119 of Korean Patent Application No. 10-2014-0094731, filed on Jul. 25, 2014, with the Korean Intellectual Property Office ("KIPO"), the content of which is incorporated herein in its entirety by reference.

BACKGROUND OF THE INVENTION

Field of the Invention

Embodiments of the inventive concept relate to a display device including a mold frame capable of improving assembly properties of a backlight assembly.

Description of the Related Art

A liquid crystal display (LCD) is a type of flat panel displays (FPDs), which is the most widely used these days, and includes a liquid crystal layer interposed between two substrates having electrodes, so that liquid crystal molecules of the liquid crystal layer are rearranged upon applying voltage to the electrodes, thereby adjusting the amount of transmitted light.

A liquid crystal display (LCD) which is a passive light emitting device includes a display panel that displays an image and a backlight assembly that supplies light to the display panel. The backlight assembly is classified into three types: a direct type, an edge type, and a corner type, based on the position of a light source.

A direct-type backlight assembly includes an upper mold on which a diffuser plate and an optical sheet are mounted and a lower mold on which a display panel is mounted. A mold frame mounted with the diffuser plate, the optical sheet, and the display panel is manufactured separately into the upper mold and the lower mold, and thus the number of assembly processes increases and manufacturing costs also increase.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding effective filing dates of subject matter disclosed herein.

SUMMARY OF THE INVENTION

Aspects of embodiments of the inventive concept are directed toward a display device enabling manufacturing cost reduction and process efficiency improvement.

According to an embodiment of the inventive concept, a display device includes a display panel, a light source configured to provide the display panel with light, a bottom chassis on which the light source is disposed, a mold frame coupled to the bottom chassis, and a diffuser plate fixed to the mold frame and configured to emit light from the light source to the display panel. The mold frame may include an upper mold on which the display panel is disposed, a lower mold on which the diffuser plate is disposed, and a first connecting part configured to couple the upper and lower molds. The mold frame may have a gap between the upper and lower molds.

The mold frame may have a gap between a lower surface of the upper mold and an upper surface of the lower mold.

The first connecting part may be disposed between an end portion of the upper mold and an end portion of the lower mold.

The first connecting part may be disposed between an end portion of the lower surface of the upper mold and an end portion of the upper surface of the lower mold.

The first connecting part may have a smaller thickness than the upper and lower molds.

The first connecting part may be made of a flexible material.

The upper mold may include a base portion, a panel mounting portion on which the display panel is disposed, a second connecting part configured to connect the base portion and the panel mounting portion, and a protrusion extending from the panel mounting portion.

The upper mold may have a gap between the base portion and the panel mounting portion.

The upper mold may have a gap between an upper surface of the base portion and a lower surface of the panel mounting portion.

The second connecting part may have a smaller thickness than the base portion and panel mounting portion.

The second connecting part may be made of a flexible material.

The second connecting part may be disposed between an end portion of the base portion and an end portion of the panel mounting portion.

The second connecting part may be disposed between an end portion of the upper surface of the base portion and an end portion of the lower surface of the panel mounting portion.

The display device may further include a top chassis mounted on the protrusion and coupled to the bottom chassis.

The display device may further include a spacer on the upper surface of the lower mold.

The spacer may support the panel mounting portion.

The display device may further include an optical sheet disposed between the diffuser plate and the display panel and having an insertion hole in which the spacer is disposed.

The display device may further include a spacer on the upper surface of the lower mold.

The spacer may support the upper mold.

The display device may further include an optical sheet disposed between the diffuser plate and the display panel and having an insertion hole in which the spacer is disposed.

According to embodiments of the inventive concept, a display device includes upper and lower molds which are integrally formed, thereby reducing manufacturing costs, and includes a first connecting part configured to couple the upper and lower molds in an assembly process of a backlight assembly, thereby improving process efficiency.

The foregoing summary is illustrative only and is not intended to be in any way limiting the claims of the inventive concept. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the inventive concept will be more clearly understood from the following detailed description taken in conjunction with the accompanying drawings, in which.

DETAILED DESCRIPTION OF THE INVENTION

Figure 1:
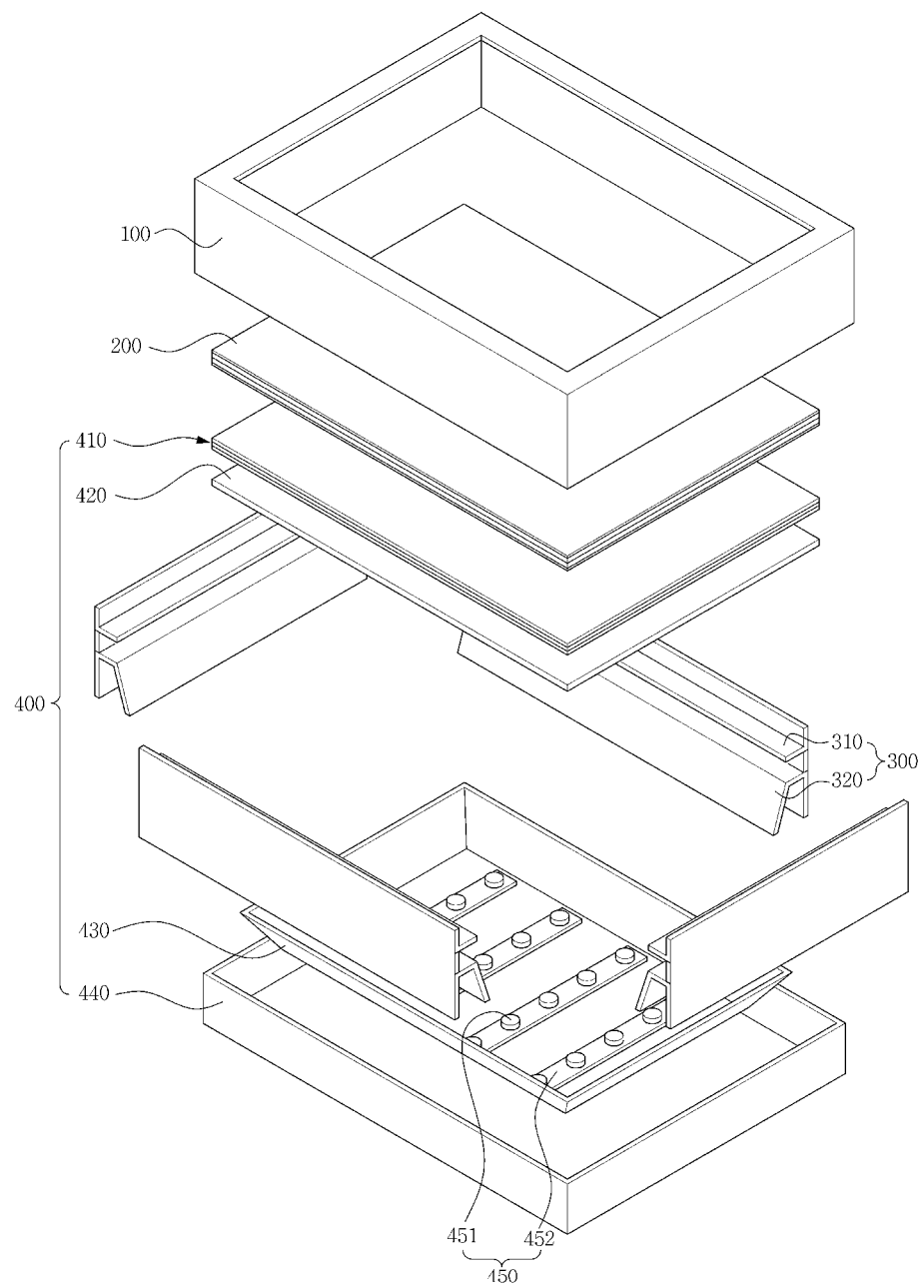
FIG. 1 is an exploded perspective view of a display device according to an embodiment of the inventive concept.

Advantages and features of the inventive concept and methods for achieving them will be made clear from embodiments described below in detail with reference to the accompanying drawings. The inventive concept may, however, be embodied in many different forms and should not be construed as being limited to the embodiments set forth herein. Rather, these embodiments are provided so that this disclosure will be thorough and complete, and will fully convey the scope of the invention to those skilled in the art. The inventive concept is merely defined by the scope of the claims. Therefore, well-known constituent elements, operations and techniques are not described in detail in the embodiments in order to prevent the inventive concept from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

The terminology used herein is for the purpose of describing particular embodiments only and is not construed as limiting the invention. As used herein, the singular forms "a," "an" and "the" are intended to include the plural forms as well, unless the context clearly indicates otherwise. It will be further understood that the terms "comprises" and/or "comprising," when used in this specification, specify the presence of mentioned component, step, operation and/or element, but do not exclude the presence or addition of one or more other components, steps, operations and/or elements.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to an embodiment of the inventive concept will be described with reference to FIGS. 1 and 2.

FIG. 1 is an exploded perspective view of a display device according to an embodiment of the inventive concept. FIG. 2 is a cross-sectional view of the display device illustrated in FIG. 1.

Figure 2:
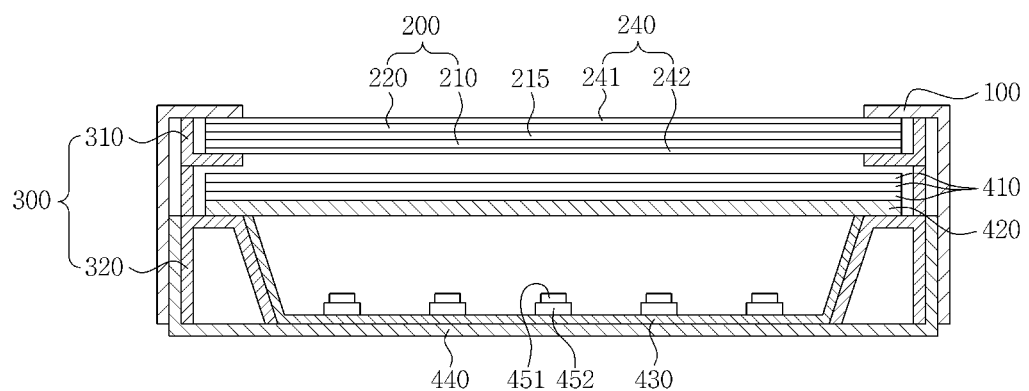
FIG. 2 is a cross-sectional view of the display device illustrated in FIG. 1.

Referring to FIGS. 1 and 2, the display device may include a display panel 200, a backlight assembly 400 configured to supply light to the display panel 200, a top chassis 100 covering the display panel 200, and a mold frame 300 on which the display panel 200 is mounted.

The top chassis 100 may be coupled to a bottom chassis 440 so as to cover the display panel 200 mounted on the mold frame 300. The top chassis 100 may have an open window in its central portion to expose the display panel 200.

Figure 8:
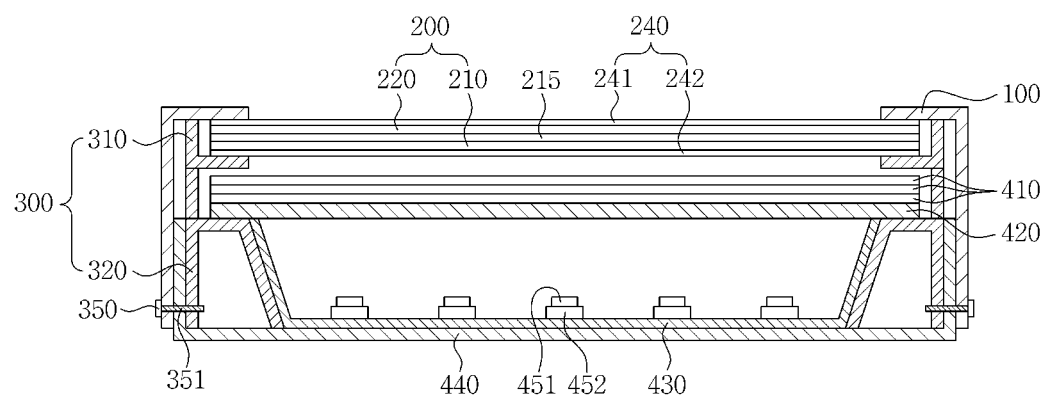
FIG. 8 is a cross-sectional view of a modification of the display device in FIG. 2.

The top chassis 100 may be coupled to the bottom chassis 440 using hooks and/or screws (FIG. 8 illustrates the coupling using screw 350). The top chassis 100 and the bottom chassis 440 may be coupled to each other in a variety of forms.

The display panel 200 may display an image. The display panel 200 may be a light receiving display panel and may include a liquid crystal display panel, an electrowetting display panel, an electrophoretic display panel, or a microelectromechanical systems (MEMS)-based display panel. In this embodiment, the display panel 200 will be described as a liquid crystal display (LCD) panel.

The display panel 200 may be shaped like quadrangular plates that have two pairs of parallel sides. In one embodiment, the display panel 200 may have a rectangular shape that has a pair of long sides and another pair of short sides. The display panel 200 may include a first substrate 210, a second substrate 220 facing the first substrate 210, and a liquid crystal layer 215 between the first and second substrates 210 and 220. The display panel 200 may include a display area that displays an image and a non-display area that surrounds the display area and that does not display an image when viewed from the top. The non-display area may be covered with the top chassis 100.

The first substrate 210 may include a plurality of pixel electrodes (not shown) and a plurality of thin film transistors (TFTs; not shown) that are electrically connected to correspond in one-to-one relationships with the pixel electrodes. Each TFT may switch driving signals supplied to its corresponding pixel electrode. The second substrate 220 may include a common electrode (not shown) that generates an electric field for controlling arrangements of liquid crystal molecules, in conjunction with the pixel electrodes. The display panel 200 may allow a liquid crystal layer 215 to be driven so as to display an image forwards.

The display panel 200 may include a driver chip (not shown) configured to supply driving signals, a tape carrier package (TCP) in which the driver chip is mounted, and a printed circuit board (PCB; not shown) electrically connected to the display panel 200 through the TCP. The driver chip may produce driving signals to drive the display panel 200 in response to external signals. The external signals may be supplied from the PCB and may include image signals, control signals, and driving voltages.

A polarizer 240 may be disposed on the display panel 200 and may include a first polarizer 241 and a second polarizer 242. The first and second polarizers 241 and 242 may be respectively disposed opposite to facing surfaces of the first and second substrates 210 and 220. That is, the first polarizer 241 may be attached to an exterior side of the first substrate 210 and the second polarizer 242 may be attached to an exterior side of the second substrate 220. The transmission axis of the first polarizer 241 may be substantially orthogonal to the transmission axis of the second polarizer 242.

The mold frame 300 may be coupled to the bottom chassis 440 and may accommodate the display panel 200, an optical sheet 410, and a diffuser plate 420. The mold frame 300 may be made of a flexible material such as plastic in order to reduce or prevent damage to the display panel 200, the optical sheet 410, and the diffuser plate 420.

In the meantime, the mold frame 300 may be coupled to the top chassis 100. In one embodiment, a screw hole 351 may be formed in the top chassis 100, the bottom chassis 440, and the mold frame 300, and then the top chassis 100, the bottom chassis 440, and the mold frame 300 may be simultaneously coupled to each other using screws 350. That is, the top chassis 100, the bottom chassis 440, and the mold frame 300 may be coupled to each other in various manners so as to be fixed to each other; FIG. 8 shows one of the ways to use screws 350 to fix the top chassis 100, the bottom chassis 440, and the mold frame 300.

The mold frame 300 may be disposed along edges of the display panel 200 and may support the display panel 200 under the display panel 200. The mold frame 300 may also support or fix other components (e.g., the optical sheet 410 or the diffuser plate 420) as well as the display panel 200. The mold frame 300 may be disposed at four sides of the display panel 200 or may be disposed in a place corresponding to at least part of the four sides of the display panel 200. In one embodiment, the mold frame 300 may have a shape of a quadrilateral loop corresponding to the four sides of the display panel 200, or may have a shape of an open quadrilateral loop corresponding to three sides selected from the edges of the display panel 200.

The backlight assembly 400 may include a plurality of the optical sheets 410, the diffuser plate 420, a reflective sheet 430, the bottom chassis 440, and a light source unit 450.

Figure 9:
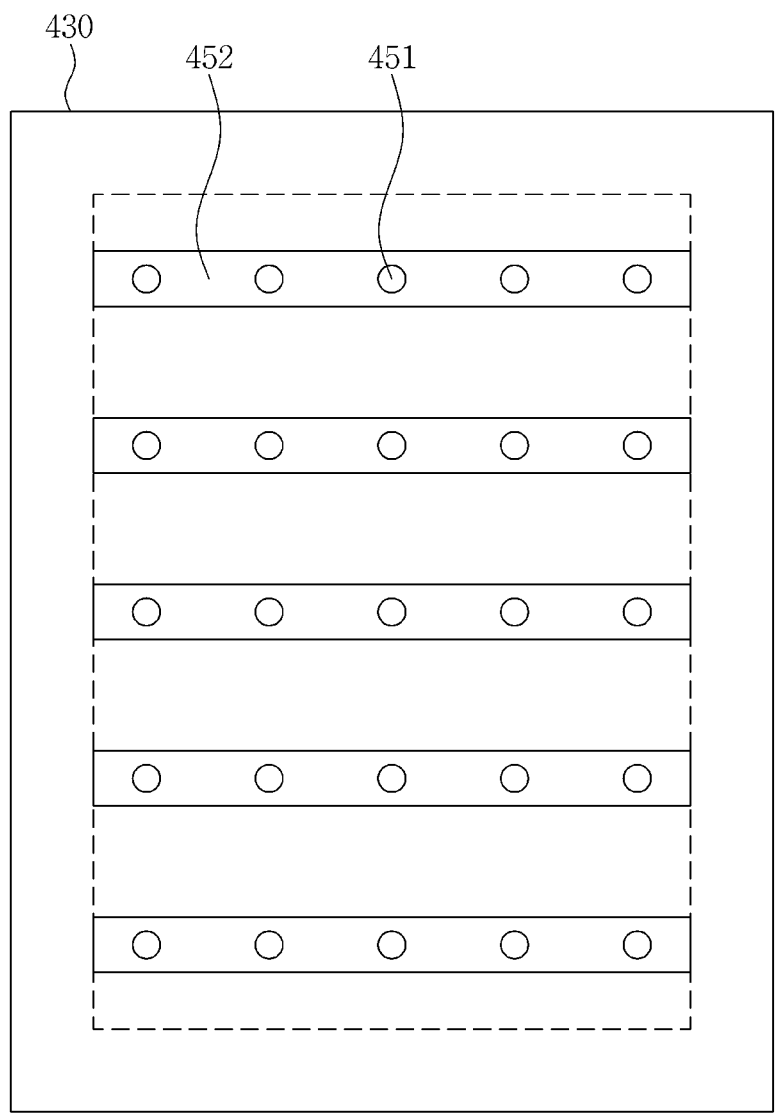
FIG. 9 is a top plane view of reflective sheet with an arrangement of light sources.

The light source unit 450 may include a light source 451 and a circuit board 452 on which the light source 451 is disposed (FIG. 9). The light source unit 450 may be disposed under the display panel 200. In one embodiment, the light source unit 450 may be disposed on a bottom surface of the reflective sheet 430 or may be disposed on a bottom surface of the bottom chassis 440.

The circuit board 452 may have a quadrangular shape (e.g., a rectangle) and may have a reflective surface. In one embodiment, a surface of the circuit board 452 may be treated with a reflective material. Further, the circuit board 452 may be made of a metal material so as to perform heat dissipation and support functions. Any metal material may be available and particular, various metal materials with high thermal conductivity may be used.

Figure 10:
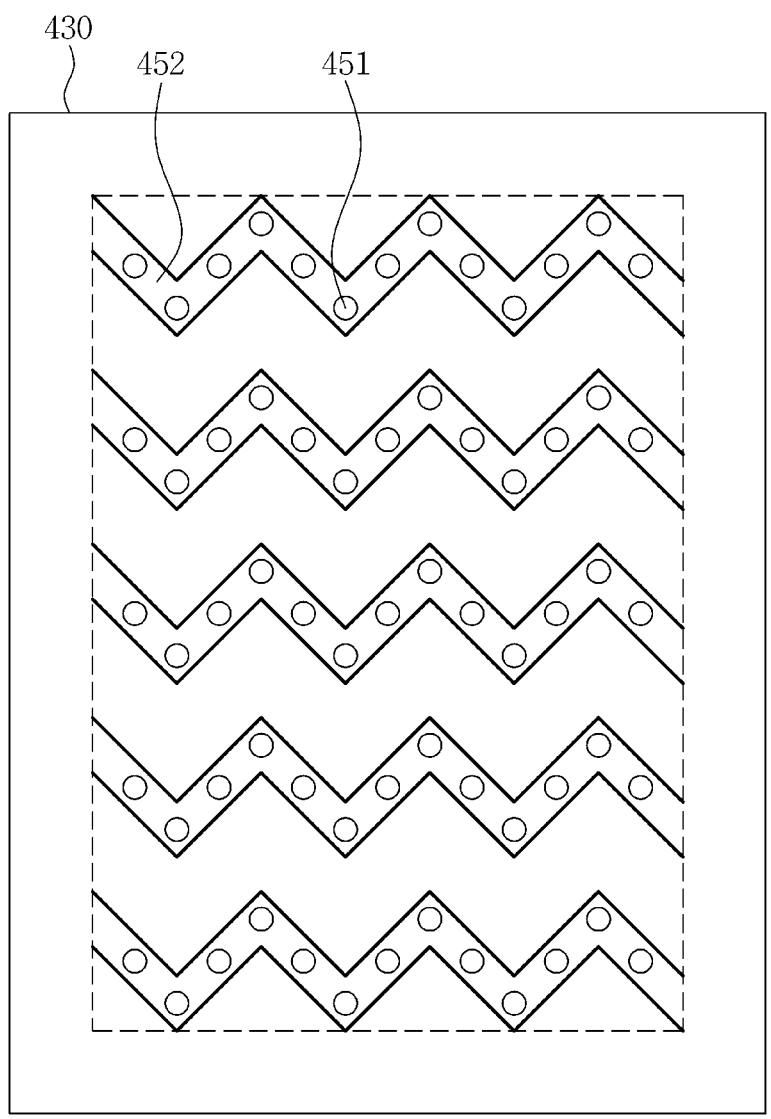
FIG. 10 is a top plane view of reflective sheet with another arrangement of light sources.
Figure 11:
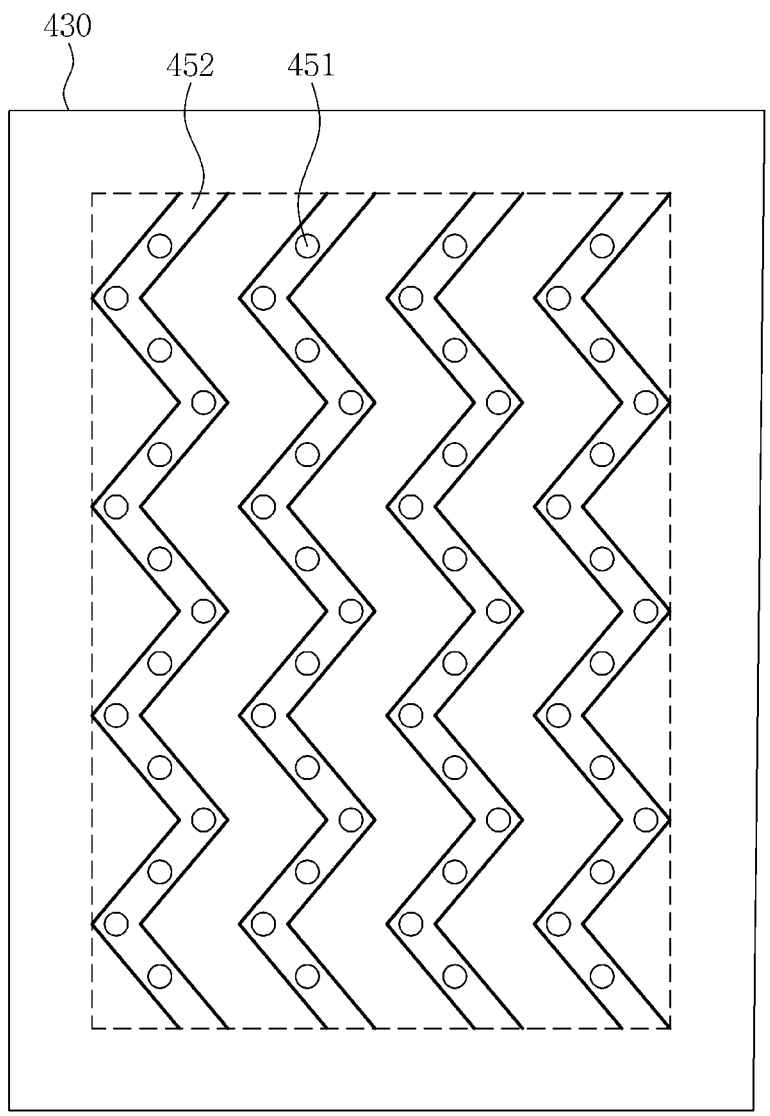
FIG. 11 is a top plane view of reflective sheet with another arrangement of light sources.

The light source 451 may include a light emitting diode (LED), etc. A plurality of light sources 451 may provide light so that a display device may display image information. Light emitted from the light source 451 may be guided towards the display panel 200 through the diffuser plate 420 and the optical sheet 410. For luminance uniformity of the light source unit 450, the light sources 451 may be spaced apart from each other by a predetermined distance. In one embodiment, a plurality of light sources 451 may be spaced apart from each other by a uniform distance in horizontal and vertical directions so as to be disposed in a matrix form. Alternatively, the light sources 451 may be aligned with each other in a vertical direction and may be arranged in a zigzag manner in a horizontal direction (FIG. 10). In contrast, the light sources 451 may be aligned with each other in a horizontal direction and may be arranged in a zigzag manner in a vertical direction (FIG. 11). However, embodiments of the inventive concept are not limited thereto. In order to obtain luminance uniformity, the light sources 451 may be arranged in various manners on the circuit board 452. Further, a coupling hole (not shown) into which a coupling member (not shown) is inserted and fixed may be formed in the circuit board 452.

The diffuser plate 420 may be disposed on the light source unit 450. The diffuser plate 420 may receive light emitted from the light source unit 450 and may diffuse the light. In other words, the diffuser plate 420 may act to improve luminance uniformity of light produced by the light source unit 450. In detail, the diffuser plate 420 may allow a bright spot, which is shown according to where the light source 451 is disposed, to be invisible on a front surface of a display device. The diffuser plate 420 may be spaced apart from the light source unit 450 by a predetermined distance with an air layer interposed therebetween.

The diffuser plate 420 may be fixed to the mold frame 300. The diffuser plate 420 may be shaped like, for example, a quadrangular plate which is similar to the display panel 200, but embodiments of the inventive concept are not limited thereto. In the case where LEDs are used as the light source 451, the diffuser plate 420 may be formed in various shapes including predetermined grooves, protrusions, or the like according to the location of the light source 451.

The diffuser plate 420 is described herein as a plate for ease of description, but it may also be provided in the form of a sheet or film to achieve slimness of a display device. That is, the diffuser plate 420 is to be understood as having a concept that includes not only a plate but also a film for guiding light.

The diffuser plate 420 may be made of a light-transmissive material, e.g., an acrylic resin such as polymethylmethacrylate (PMMA) or polycarbonate (PC), so as to guide light efficiently.

The optical sheet 410 may be disposed on the diffuser plate 420 and may serve to diffuse and collimate light transmitted from the diffuser plate 420. The optical sheet 410 may include a diffusion sheet, a prism sheet, a protective sheet, and the like. The diffusion sheet may diffuse light incident from the diffuser plate 420 so as to prevent the light from being partially concentrated. The prism sheet may have triangular prisms on one surface thereof in a predetermined arrangement and may be disposed on the diffusion sheet so as to collimate light diffused by the diffusion sheet in a direction perpendicular to the display panel 200. The protective sheet may be disposed on the prism sheet so as to protect a surface of the prism sheet and diffuse light to obtain uniformly distributed light.

The reflective sheet 430 may be disposed between the light source unit 450 and the bottom chassis 440, so that light emitted downwards from the diffuser plate 420 is reflected towards the display panel 200, thereby increasing light efficiency.

The reflective sheet 430 may include a bottom part and an inclined part extending to form an obtuse angle with the bottom part. The bottom part of the reflective sheet 430 may be placed on the bottom chassis 440 and the inclined part of the reflective sheet 430 may be disposed on the mold frame 300.

The reflective sheet 430 may be made of, for example, polyethylene terephthalate (PET) which imparts reflective properties, and one surface of the reflective sheet 430 may be coated with a diffusion layer containing, for example, titanium dioxide.

Meanwhile, the reflective sheet 430 may be made of a material containing a metal such as silver (Ag).

The bottom chassis 440 may accommodate the reflective sheet 430 and the diffuser plate 420. A bottom surface of the bottom chassis 440 may be disposed parallel to the diffuser plate 420. The bottom chassis 440 may be made of a metal material having hardness such as stainless steel or a material having good heat dissipation properties such as aluminum or an aluminum alloy. In this embodiment, the bottom chassis 440 may be configured to maintain a shape of a display device and protect a variety of components accommodated in the bottom chassis 440.

In such a display device configuration, the mold frame 300 may be integrally formed to reduce manufacturing costs and improve process efficiency. Hereinafter, the mold frame 300 according to some embodiments of the inventive concept will be fully described with reference to FIGS. 2 to 5B.

Figure 3A:
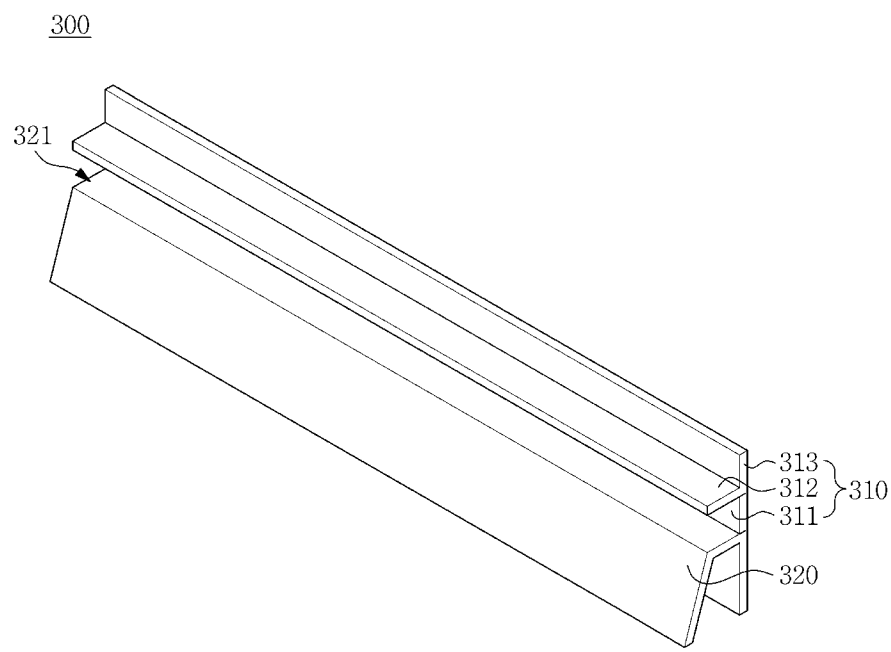
FIG. 3A is a perspective view illustrating a mold frame illustrated in FIG. 1.
Figure 3B:
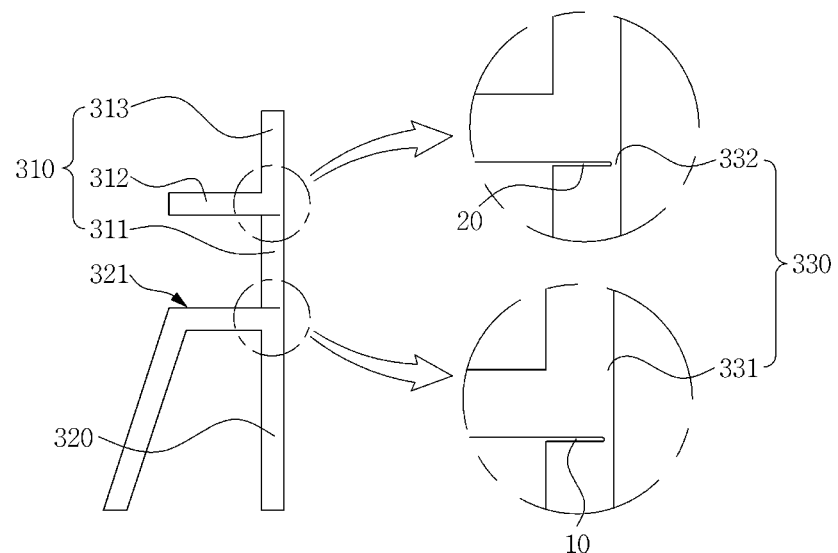
FIG. 3B is a cross-sectional view of the mold frame illustrated in FIG. 1.
Figure 4A:
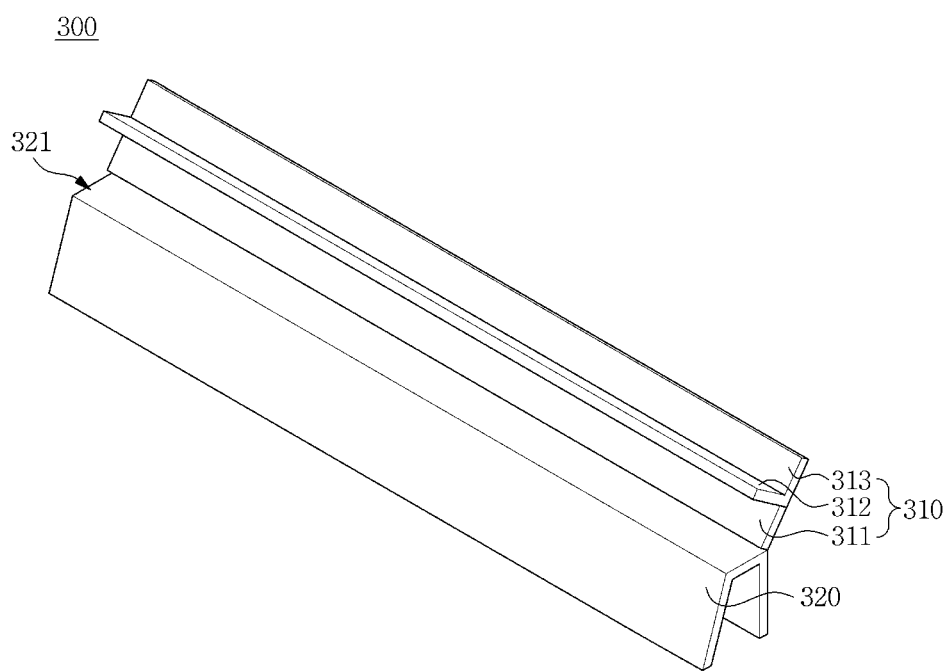
FIG. 4A is a perspective view illustrating a folded upper mold.
Figure 4B:
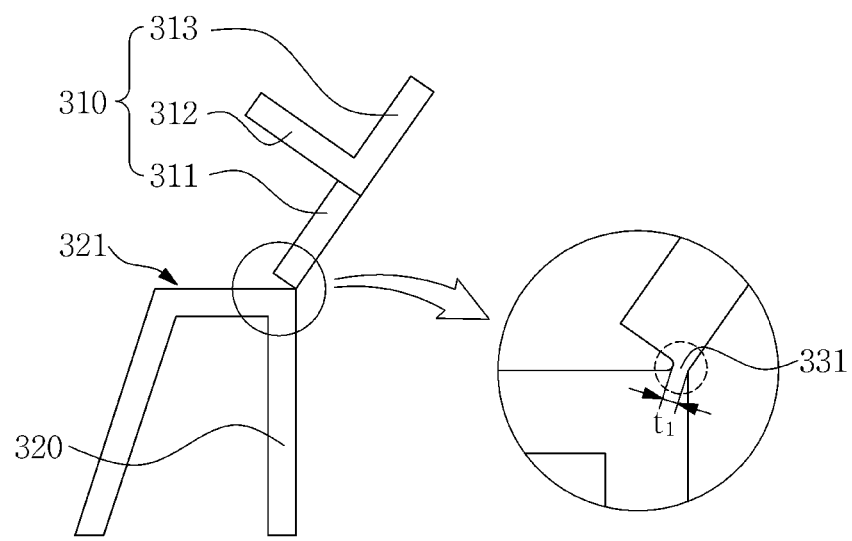
FIG. 4B is a cross-sectional view illustrating a folded upper mold.
Figure 5A:
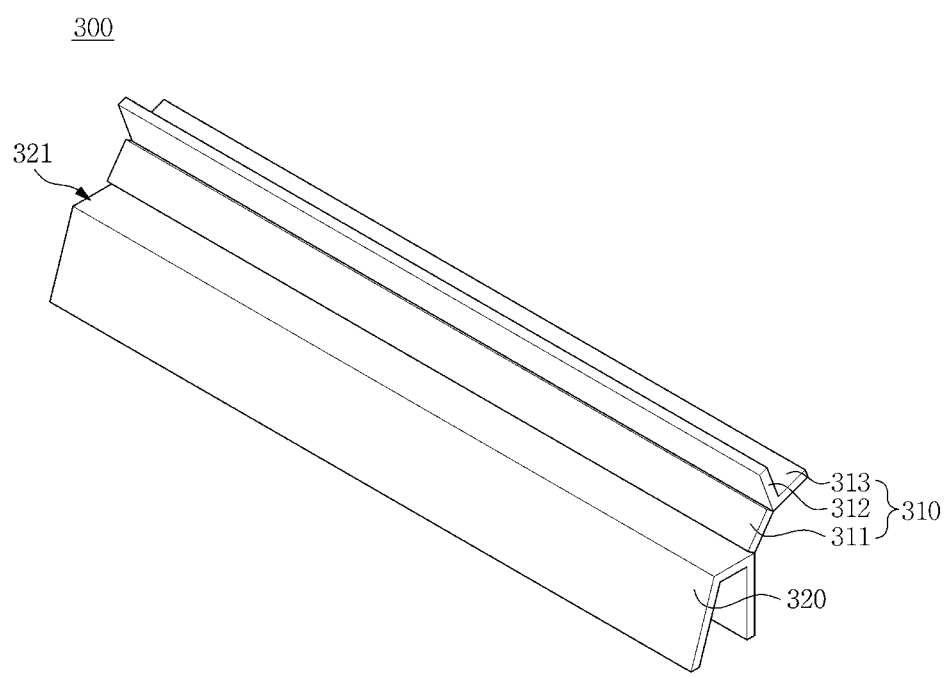
FIG. 5A is a perspective view illustrating a folded panel mounting portion.
Figure 5B:
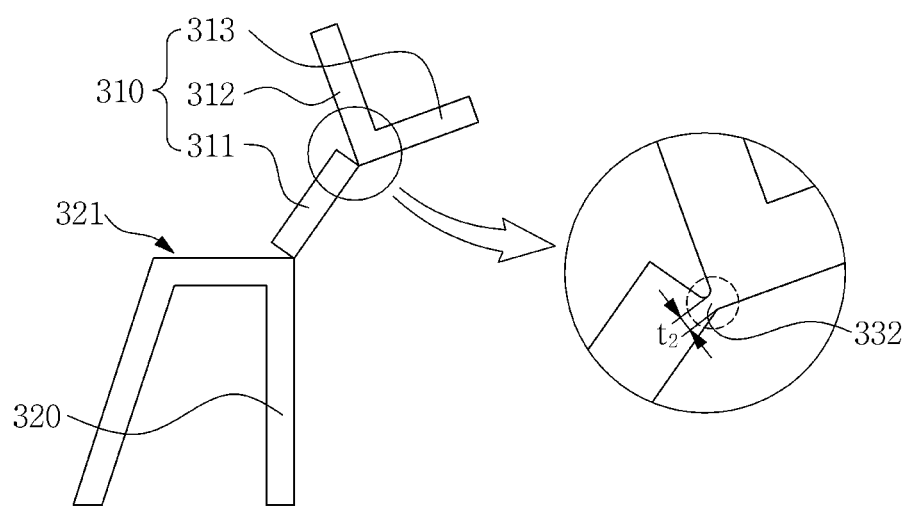
FIG. 5B is a cross-sectional view illustrating a folded panel mounting portion.

FIG. 3A is a perspective view illustrating the mold frame illustrated in FIG. 1. FIG. 3B is a cross-sectional view of the mold frame illustrated in FIG. 1. FIG. 4A is a perspective view illustrating a folded upper mold. FIG. 4B is a cross-sectional view illustrating a folded upper mold. FIG. 5A is a perspective view illustrating a folded panel mounting portion. FIG. 5B is a cross-sectional view illustrating a folded panel mounting portion.

Referring to FIGS. 2 to 3B, the mold frame 300 may include an upper mold 310 on which the display panel 200 is disposed, a lower mold 320 on which the diffuser plate 420 is disposed, and a mold frame connector 330.

The upper mold 310 may support the display panel 200. The upper mold 310 may include a base portion 311, a panel mounting portion 312 on which the display panel 200 is disposed, and a protrusion 313 extending from the panel mounting portion 312.

The base portion 311 may support the panel mounting portion 312 and the protrusion 313. The panel mounting portion 312 may support the display panel 200. The protrusion 313 may be mounted with the top chassis 100.

The lower mold 320 may be mounted with the diffuser plate 420 and the optical sheet 410 on its upper surface 321 and may support the upper mold 310. The lower mold 320 may be mounted with the upper mold 310 on its upper surface 321. In one embodiment, a lower surface of the base portion 311 may be located on the upper surface 321 of the lower mold 320.

The mold frame 300 may include the mold frame connector 330. The mold frame connector 330 may include a first connecting part 331 configured to connect the upper and lower molds 310 and 320 and a second connecting part 332 configured to connect the base portion and panel mounting portion 311 and 312.

The first connecting part 331 may be disposed between an end portion of the upper mold 310 and an end portion of the lower mold 320. In one embodiment, the first connecting part 331 may be disposed between an end portion of a lower surface of the upper mold 310 and an end portion of the upper surface 321 of the lower mold 320. The first connecting part 331 may have a smaller thickness $t_1$ than the upper and lower molds 310 and 320. As illustrated in FIG. 3B, the first connecting part 331 may have a small thickness $t_1$ and may connect the upper and lower molds 310 and 320. In the meantime, the first connecting part 331 may include a material that is more flexible than materials of the upper and lower molds 310 and 320.

The second connecting part 332 may be disposed between an end portion of the base portion 311 and an end portion of the panel mounting portion 312. In one embodiment, the second connecting part 332 may be disposed between an end portion of an upper surface of the base portion 311 and an end portion of a lower surface of the panel mounting portion 312. The second connecting part 332 may have a smaller thickness $t_2$ than the base portion 311 and the panel mounting portion 312. As illustrated in FIG. 3B, the second connecting part 332 may have a small thickness $t_2$ and may connect the base portion 311 and the panel mounting portion 312. In the meantime, the second connecting part 332 may include a material that is more flexible than materials of the upper and lower molds 310 and 320.

The mold frame 300 may have a gap 10 between the upper and lower molds 310 and 320. In one embodiment, the mold frame 300 may have the gap 10 between the lower surface of the upper mold 310 and the upper surface 321 of the lower mold 320. Further, the upper mold 310 may have a gap 20 between the base portion 311 and the panel mounting portion 312. In one embodiment, the upper mold 310 may have the gap 20 between the upper surface of the base portion 311 and the lower surface of the panel mounting portion 312.

Meanwhile, the gaps 10 and 20 may have a size in a range of 0.001 mm to 1 mm. The upper mold 310 may accommodate the display panel 200, and thus a pressure equivalent to a weight of the display panel 200 may be applied to the upper mold 310. Therefore, the gaps 10 and 20 in the mold frame 300 may have a very small size depending on where the first and second connecting parts 331 and 332 are disposed.

As described above, the mold frame 300 may include the first and second connecting parts 331 and 332, and thus the upper mold 310 may be folded to be spaced apart from the lower mold 320.

Referring to FIGS. 2, 4A, and 4B, the upper mold 310 may be folded to be spaced apart from the upper surface 321 of the lower mold 320. This is because the mold frame 300 has a gap between the upper and lower molds 310 and 320 and the thickness $t_1$ of the first connecting part 331 may be smaller than those of the upper and lower molds 310 and 320. Further, the first connecting part 331 may be made of a flexible material.

Referring to FIGS. 2, 5A, and 5B, the panel mounting portion 312 may be folded to be spaced apart from the upper surface of the base portion 311. This is because the upper mold 310 has a gap between the base portion 311 and the panel mounting portion 312 and the thickness $t_2$ of the second connecting part 332 may be smaller than that of the upper mold 310. Further, the second connecting part 332 may be made of a flexible material.

The upper mold 310 and the panel mounting portion 312 may be folded as illustrated in FIGS. 4A and 5B in an assembly process in which the diffuser plate 420 and the optical sheet 410 are disposed on the upper surface 321 of the lower mold 320. Therefore, the assembly process that couples the lower mold 320 to the upper mold 310 separately fabricated may be omitted, and thus process efficiency may be improved.

Hereinafter, a display device according to another embodiment will be described with reference to FIGS. 6 and 7. Descriptions of repeated configurations may not be provided for brevity.

Figure 6:
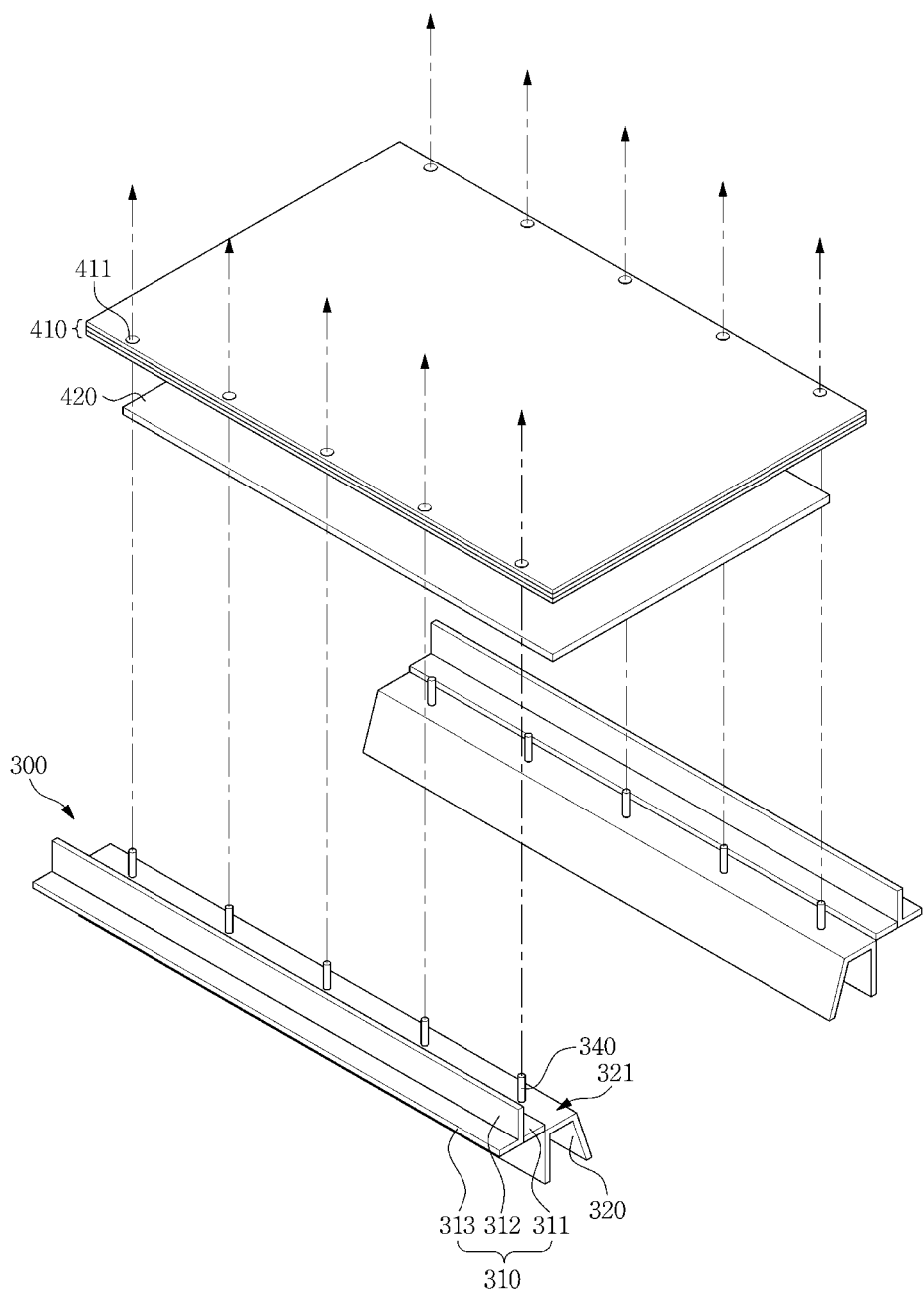
FIG. 6 is an exploded perspective view illustrating an optical sheet and a mold frame according to another embodiment of the inventive concept.

FIG. 6 is an exploded perspective view illustrating an optical sheet and a mold frame according to another embodiment of the inventive concept. FIG. 7 is a cross-sectional view of a display device according to another embodiment of the inventive concept.

Figure 7:
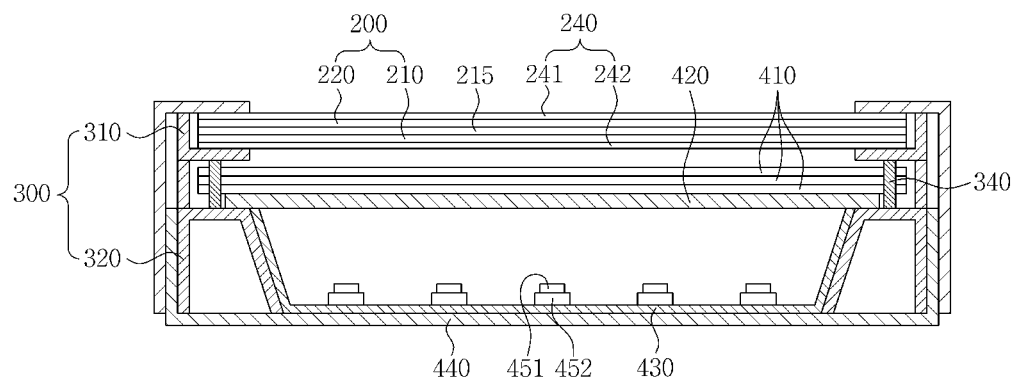
FIG. 7 is a cross-sectional view of a display device according to another embodiment of the inventive concept.

Referring to FIGS. 6 and 7, the mold frame 300 may further include a spacer 340. The spacer 340 may be disposed on the upper surface 321 of the lower mold 320 and may support the upper mold 310. In one embodiment, the spacer 340 may support the panel mounting portion 312.

Further, the spacer 340 may fix the optical sheet 410. The optical sheet 410 may have an insertion hole 411 in its edge portion. The spacer 340 may be inserted into the insertion hole 411, and thus the optical sheet 410 may be fixed to the mold frame 300.

The spacer 340 may be disposed on the mold frame 300 so that the mold frame 300 may have improved hardness and defects caused by expansion or contraction of the optical sheet 410 may be reduced.

From the foregoing, it will be appreciated that various embodiments of the inventive concept have been described herein for purposes of illustration, and that various modifications may be made without departing from the scope and spirit of the present disclosure. Accordingly, the various embodiments disclosed herein are not intended to limit the scope of the inventive concept, and the true scope and spirit of the inventive concept is indicated by the following claims, and equivalents thereof.

What is claimed is:

1. A display device comprising:
   a display panel;
   a light source configured to provide the display panel with light;
   a bottom chassis on which the light source is disposed;
   a mold frame coupled to the bottom chassis; and
   a diffuser plate fixed to the mold frame and configured to emit light from the light source to the display panel,
   wherein the mold frame comprises:
      an upper mold on which the display panel is disposed;
      a lower mold on which the diffuser plate is disposed; and
      a first connecting part configured to couple the upper and lower molds and the first connecting part has smaller thickness than the upper and lower molds.

2. The display device of claim 1, wherein the mold frame has a gap between the upper and lower molds, and the gap being between a lower surface of the upper mold and an upper surface of the lower mold.

3. The display device of claim 1, wherein the first connecting part is disposed between an end portion of the upper mold and an end portion of the lower mold.

4. The display device of claim 3, wherein the first connecting part is disposed between an end portion of the lower surface of the upper mold and an end portion of the upper surface of the lower mold.

5. The display device of claim 1, wherein the first connecting part is made of a flexible material.

6. The display device of claim 1, wherein the upper mold comprises:
   a base portion;
   a panel mounting portion on which the display panel is disposed;
   a second connecting part configured to connect the base portion and the panel mounting portion; and
   a protrusion extending from the panel mounting portion.

7. The display device of claim 6, wherein the upper mold has a gap between the base portion and the panel mounting portion.

8. The display device of claim 6, wherein the upper mold has a gap between an upper surface of the base portion and a lower surface of the panel mounting portion.

9. The display device of claim 6, wherein the second connecting part has a smaller thickness than the base portion and panel mounting portion.

10. The display device of claim 6, wherein the second connecting part is made of a flexible material.

11. The display device of claim 6, wherein the second connecting part is disposed between an end portion of the base portion and an end portion of the panel mounting portion.

12. The display device of claim 6, wherein the second connecting part is disposed between an end portion of the upper surface of the base portion and an end portion of the lower surface of the panel mounting portion.

13. The display device of claim 6, further comprising a top chassis mounted on the protrusion and coupled to the bottom chassis.

14. The display device of claim 6, further comprising a spacer on the upper surface of the lower mold.

15. The display device of claim 14, wherein the spacer supports the panel mounting portion.

16. The display device of claim 14, further comprising an optical sheet between the diffuser plate and the display panel, the optical sheet having an insertion hole in which the spacer is disposed.

17. The display device of claim 1, further comprising a spacer on the upper surface of the lower mold.

18. The display device of claim 17, wherein the spacer supports the upper mold.

19. The display device of claim 17, further comprising an optical sheet between the diffuser plate and the display panel, the optical sheet having an insertion hole in which the spacer is disposed.

* * * * *